US009481936B2

(12) United States Patent
Ha et al.

(10) Patent No.: US 9,481,936 B2
(45) Date of Patent: Nov. 1, 2016

(54) NANOPLATELET-TYPE ZIRCONIUM PHOSPHATE AND METHOD FOR PREPARING SAME

(75) Inventors: Bongwoo Ha, Gwangyang-si (KR); Jin Tae Kim, Gwangyang-si (KR); Jong Sang Kim, Gwangyang-si (KR); Yang-Ho Choi, Gwangyang-si (KR)

(73) Assignee: POSCO, Pohang-si (KR)

( * ) Notice: Subject to any disclaimer, the term of this patent is extended or adjusted under 35 U.S.C. 154(b) by 239 days.

(21) Appl. No.: 13/824,559

(22) PCT Filed: Dec. 27, 2011

(86) PCT No.: PCT/KR2011/010181
§ 371 (c)(1),
(2), (4) Date: Aug. 19, 2013

(87) PCT Pub. No.: WO2012/091426
PCT Pub. Date: Jul. 5, 2012

(65) Prior Publication Data
US 2013/0330539 A1    Dec. 12, 2013

(30) Foreign Application Priority Data

Dec. 28, 2010    (KR) .................. 10-2010-0136802

(51) Int. Cl.
*C01B 25/37*     (2006.01)
*C23F 11/18*     (2006.01)
(Continued)

(52) U.S. Cl.
CPC ........... *C23F 11/184* (2013.01); *C01B 25/372* (2013.01); *C09D 5/084* (2013.01);
(Continued)

(58) Field of Classification Search
CPC ....... C01B 25/372; C01B 25/26; C01B 25/37; C01P 2004/20–2004/24; C01P 2002/72
See application file for complete search history.

(56) References Cited

U.S. PATENT DOCUMENTS 4,381,289 A    4/1983    Nowell et al.
6,312,821 B1    11/2001    Takasaki et al.
(Continued)

FOREIGN PATENT DOCUMENTS

JP    62-226807 A    10/1987
JP    03-150214 A    6/1991
(Continued)

OTHER PUBLICATIONS

Nagarale et al, "Progress in ionic organic-inorganic composite membranes for fuel cell applications" Dec. 23, 2009 Royal Society of Chemistry, available at http://pubs.rsc.org/en/content/articlehtml/2010/py/b9py00235a , pp. 1-46.*
(Continued)

*Primary Examiner* — Anthony J Zimmer
*Assistant Examiner* — Justin Bova
(74) *Attorney, Agent, or Firm* — The Webb Law Firm

(57) ABSTRACT

A platelet-type zirconium phosphate, which has a P—OH group contained in a structure thereof, and has a crystalline peak at a 2θ value of 11.6±2 degrees and no crystalline peak at a 2θ value of less than 11.6±2 degrees in X-ray diffraction analysis, is provided. The platelet-type zirconium phosphate has a platelet-type structure and can be uniformly dispersed at a nanoscale level in a coating film to exhibit excellent surface gloss and barrier capability. Also, the platelet-type zirconium phosphate can exhibit excellent corrosion resistance due to the presence of the P—OH group on a surface thereof, and can be dispersed not only in an aqueous solution but also in an organic solvent.

7 Claims, 5 Drawing Sheets

(51) Int. Cl.
  *C09D 5/08*   (2006.01)
  *C09D 7/12*   (2006.01)
  *C08K 3/32*   (2006.01)

(52) U.S. Cl.
  CPC ......... *C09D 7/1216* (2013.01); *C09D 7/1291* (2013.01); *C01P 2004/24* (2013.01); *C08K 2003/321* (2013.01); *Y10T 428/256* (2015.01); *Y10T 428/2982* (2015.01)

(56) References Cited

U.S. PATENT DOCUMENTS

| | | |
|---|---|---|
| 2004/0151619 A1 | 8/2004 | Quellhorst et al. |
| 2008/0159940 A1 | 7/2008 | Aupaix et al. |
| 2010/0293788 A1 | 11/2010 | Schoenherr et al. |

FOREIGN PATENT DOCUMENTS

| | | |
|---|---|---|
| JP | 05-017112 A | 1/1993 |
| JP | 2008-503436 A | 2/2008 |
| KR | 20040016456 A | 2/2004 |
| KR | 20100030082 A | 3/2010 |
| KR | 20110077399 A | 7/2011 |

OTHER PUBLICATIONS

Kangjian, Tang, et al., "Preparation and Characterization of Layered Zirconium Phosphates Based on Water-in-Oil Microemulsion", Chemical Journal of Chinese Universities, vol. 28, Issue 1, pp. 6-9.

Bellezza, Francesca et al., "Zirconium phosphate nanoparticles from water-in-oil nnicroemulsions", Colloid Polym Sci (Aug. 3, 2006) vol. 285: 19-25.

Bellezza, Francesca, et al., "Zirconium phosphate nonparticles from water-in-oil microemulsions", Colloid and Polymer Science, Berlin DE, vol. 285, No. 1, Aug. 3, 2006, pp. 19-25.

Nagarale, R. K., et al., "Progress in ionic organic-inorganic composite membranes for fuelcell applications", Polymer Chemistry, vol. 1, No. 4, Jan. 1, 2010, pp. 388-408.

* cited by examiner

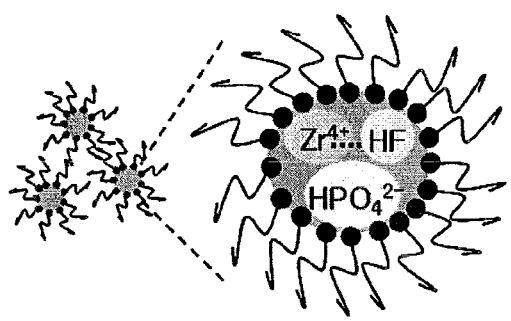
FIG. 4
FIG. 5
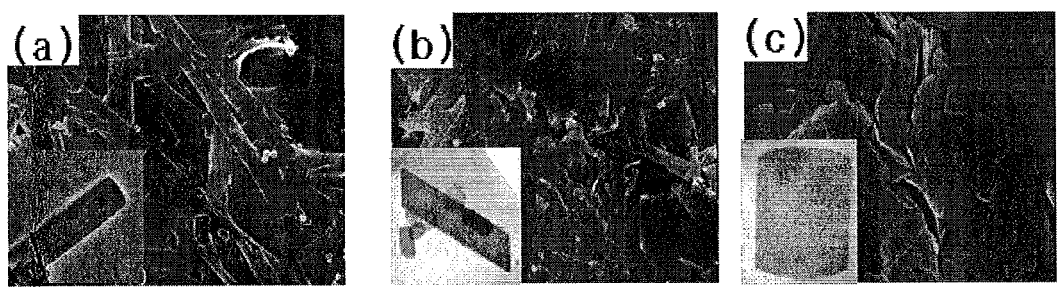
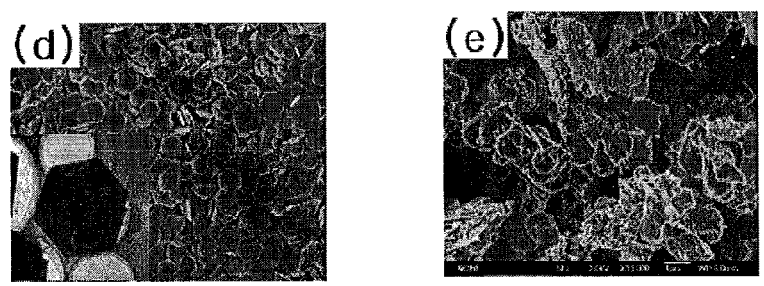

NANOPLATELET-TYPE ZIRCONIUM PHOSPHATE AND METHOD FOR PREPARING SAME

CROSS-REFERENCE TO RELATED APPLICATION

This application claims priority to and the benefit of Korean Patent Application No. 2010-0136802, filed Dec. 28, 2010, the disclosure of which is incorporated herein by reference in its entirety.

BACKGROUND

1. Field of the Invention

The present invention relates to a platelet-type zirconium phosphate and a method for preparing the same.

2. Discussion of Related Art

In general, a metal sheet (for example, a steel plate and an aluminum plate) is a material which is very important in modern industries and has been widely used for home electronic appliances, automobiles, and building materials. However, these metals have a problem in that they corrode easily since they produce a corrosion product in the air or by contact with moisture. Also, the metals show insufficient coatability with a paint, and their surfaces are easily contaminated by a user's fingerprint, etc.

To solve the above-described problems, especially to improve the corrosion resistance and fingerprint resistance, chromate treatment has been carried out.

The chromate treatment can exhibit an anti-corrosion effect in a short period of time even when chromate is used alone and also highly improve the anti-corrosion capability of a paint as a steel sheet is coated with a resin paint. Also, the chromate treatment can enhance close adhesion between the paint and the steel sheet and thus has been used as an essential process for preparing a painted steel sheet. As the use of materials, such as hexavalent chromium, lead, and mercury, which are toxic to a human body, has been inhibited all over the world, however, the chromate treatment used to improve the corrosion resistance in all steel sheets except for some steel products has been restricted.

Therefore, to replace the chromate treatment, the steel and paint manufacturers have made an effort to improve the corrosion resistance by coating a surface of a metal sheet with a resin composition for surface treatment. The resin composition is composed of a binder resin and a solvent and serves to improve the corrosion resistance of a metal sheet since a metal such as silica, phosphate, zirconium, or titanium is added as a corrosion-resistant additive. However, the additives are composed of inorganic particles and thus have problems in that the corrosion resistance in the interface may be lowered and a reduction in gloss may be caused by surface irregular reflection.

To solve the above problems, a platelet-type zirconium phosphate (ZrP) may be used as a corrosion-resistant additive to improve the corrosion resistance of a steel sheet, etc. In this case, the zirconium phosphate additive may be prepared using a method as shown in FIG. 1. That is, the zirconium phosphate additive may be prepared by mixing zirconium ions, phosphate ions, and hydrogen fluoride with water, heating the resulting mixture at 50 to 60° C. for approximately 24 hours, adding an organic modifier, and dispersing the mixture.

However, the additive prepared by the method does not have a significant effect of improving the corrosion resistance since a P—OH group is destroyed by the organic modifier, and is applicable to a water-soluble resin since it is easily dispersed in water.

SUMMARY OF THE INVENTION

The present invention is directed to providing a zirconium phosphate additive and a method for preparing the same. Here, the zirconium phosphate additive has a platelet-type structure and may be uniformly dispersed at a nanoscale level in a coating film to exhibit excellent surface gloss and barrier capability. Also, the zirconium phosphate additive can exhibit excellent corrosion resistance due to presence of a P—OH group on a surface thereof, and may be dispersed not only in an aqueous solution but also in an organic solvent.

One aspect of the present invention provides a platelet-type zirconium phosphate containing a P—OH group in a structure thereof and having a crystalline peak at a $2\theta$ value of $11.6\pm2$ degrees and no crystalline peak at a $2\theta$ value of less than $11.6\pm2$ degrees in X-ray diffraction analysis.

Another aspect of the present invention provides a method for preparing a platelet-type zirconium phosphate. Here, the method includes heating a microemulsion including zirconium ions, phosphate ions, an acid compound, and a non-ionic surfactant.

Still another aspect of the present invention provides a metal material including a substrate, and a resin coating layer formed on the substrate and including the above-described platelet-type zirconium phosphate.

BRIEF DESCRIPTION OF THE DRAWINGS

The above and other objects, features, and advantages of the present invention will become more apparent to those of ordinary skill in the art by describing in detail exemplary embodiments thereof with reference to the attached drawings, in which:

FIG. 4 is a diagram showing the compositions of a microemulsion according to one exemplary embodiment of the present invention;

FIG. 5 is a scanning electron microscope (SEM) image showing the shapes of the platelet-type zirconium phosphates prepared in Example 1 and Comparative Example 1;

DETAILED DESCRIPTION OF EXEMPLARY EMBODIMENTS

Figure 1:
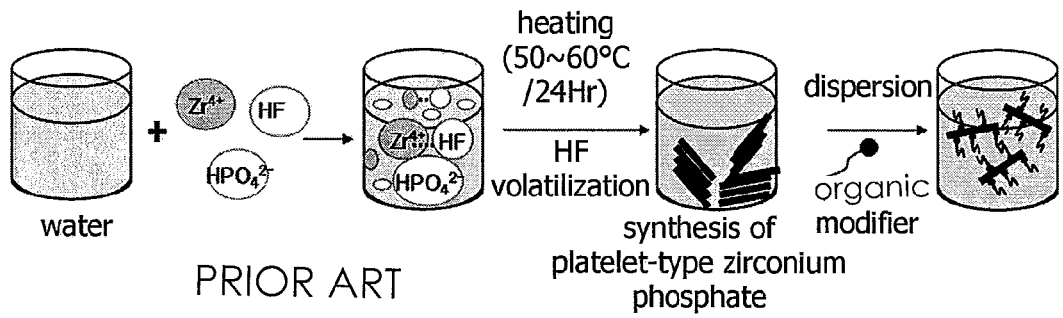
FIG. 1 is a schematic diagram showing a conventional method for preparing a zirconium phosphate.

Hereinafter, exemplary embodiments of the present invention will be described in detail. However, the present invention is not limited to the embodiments disclosed below, but can be implemented in various forms. The following embodiments are described in order to enable those of ordinary skill in the art to embody and practice the present invention.

Although the terms first, second, etc. may be used to describe various elements, these elements are not limited by these terms. These terms are only used to distinguish one element from another. For example, a first element could be termed a second element, and, similarly, a second element could be termed a first element, without departing from the scope of exemplary embodiments. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of exemplary embodiments. The singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, components, and/or groups thereof, but do not preclude the presence or addition of one or more other features, integers, steps, operations, elements, components, and/or groups thereof.

With reference to the appended drawings, exemplary embodiments of the present invention will be described in detail below. To aid in understanding the present invention, like numbers refer to like elements throughout the description of the figures, and the description of the same elements will be not reiterated.

The present invention is directed to providing a platelet-type zirconium phosphate which contains a P—OH group in a structure thereof, and has a crystalline peak at a 2θ value of 11.6±2 degrees and no crystalline peak at a 2θ value of less than 11.6±2 degrees in X-ray diffraction analysis.

Hereinafter, the platelet-type zirconium phosphate according to the present invention will be described in further detail.

According to one exemplary embodiment of the present invention, the platelet-type zirconium phosphate contains a P—OH group in a structure thereof, and has a crystalline peak at a 2θ value of 11.6±2 degrees in the X-ray diffraction analysis, as described above. Here, the crystalline peak may be observed at approximately 0.75 nm. Also, the platelet-type zirconium phosphate according to the present invention shows no crystalline peak at a 2θ value of less than 11.6±2 degrees.

A zirconium phosphate prepared by a conventional preparation method does not have a peak at a 2θ value of 11.6±2 degrees since a P—OH group present on a surface of the zirconium phosphate is destroyed by an organic modifier. However, the platelet-type zirconium phosphate according to the present invention has a crystalline peak at a 2θ value of 11.6±2 degrees and thus may facilitate improvement of corrosion resistance.

Also, the platelet-type zirconium phosphate according to the present invention shows a mass loss at 400° C. of less than 5%, as measured in the thermogravimetric analysis (TGA).

Figure 2:
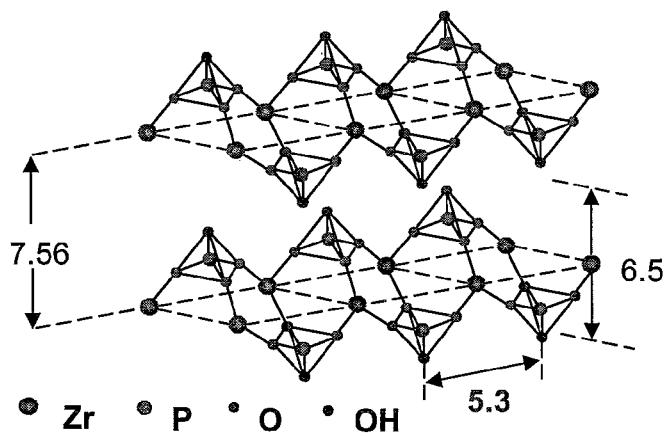
FIG. 2 is a diagram showing a cross-sectional crystal structure of a platelet-type zirconium phosphate according to the present invention.

FIG. 2 is a diagram showing a cross-sectional crystal structure of the platelet-type zirconium phosphate according to the present invention. As shown in FIG. 2, the zirconium phosphate may be formed in a platelet type and include a structural unit in which oxygen atoms in a tetrahedron composed of $PO_3(OH)$ are bound respectively to three zirconium atoms.

According to the present invention, the P—OH group formed on a surface of the platelet-type zirconium phosphate serves to improve corrosion resistance.

According to the present invention, an atomic weight ratio between zirconium and phosphorus may be in a range of approximately 1:2.

According to the present invention, the particle shape of zirconium phosphate is not particularly limited. Here, the zirconium phosphate may have a polygonal shape. According to the present invention, the zirconium phosphate may have various shapes such as, for example, belt, lozenge, square, or hexagonal shapes.

According to the present invention, the particle size of zirconium phosphate is also not particularly limited. For example, the zirconium phosphate may have a particle size of 0.1 to 10 μm. When the particle size of the zirconium phosphate is less than 0.1 μm, the zirconium phosphate may secondarily lump since the zirconium phosphate with a particle shape does not grow into a planar shape. On the other hand, when the particle size of the zirconium phosphate exceeds 10 μm, dispersibility in a resin may be degraded.

According to the present invention, the platelet-type zirconium phosphate may be easily dispersed not only in a water-soluble solvent such as water but also in an organic solvent such as alcohol, acetone, methyl ethyl ketone, xylene, ketone, and a thinner, and various solvents such as a UV-curable diluent.

Also, the present invention is directed to providing a method for preparing a platelet-type zirconium phosphate, which includes heating a microemulsion including zirconium ions, phosphate ions, a fluoride compound, and a non-ionic surfactant.

Figure 3:
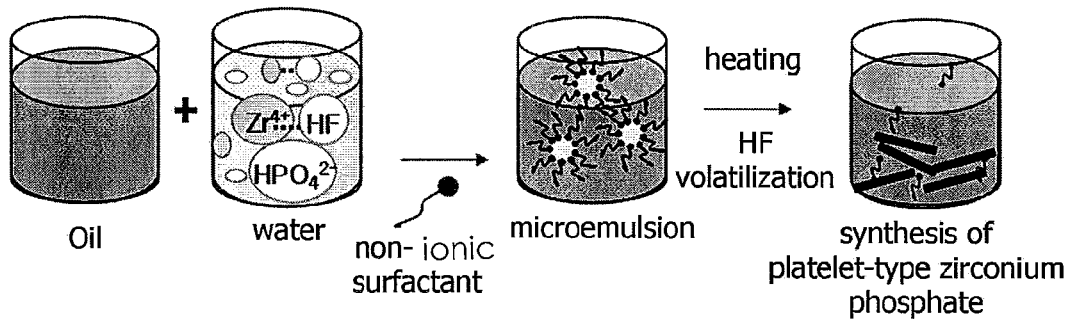
FIG. 3 is a schematic diagram showing a method for preparing a platelet-type zirconium phosphate according to one exemplary embodiment of the present invention.

FIG. 3 is a diagram showing a method for preparing a platelet-type zirconium phosphate according to one exemplary embodiment of the present invention. As shown in FIG. 3, according to the present invention, a platelet-type zirconium phosphate may be prepared by heating a microemulsion, which includes oil, a non-ionic surfactant, and water including zirconium ions, phosphate ions, and a fluoride compound, at a predetermined temperature for a predetermined period of time.

According to the present invention, the microemulsion may be, for example, prepared by mixing oil with water including zirconium ions, phosphate ions, and a fluoride compound and adding a non-ionic surfactant to the resulting mixture solution.

The zirconium ions according to one exemplary embodiment of the present invention may serve to improve corrosion resistance of the prepared resin coating layer.

According to the present invention, the zirconium ions may be, for example, present in at least one zirconium compound selected from the group consisting of zirconium chloride ($ZrCl_4 \cdot xH_2O$), zirconium sulfate ($Zr(SO_4)_2 \cdot xH_2O$), and zirconium hydroxide ($Zr(OH)_4$).

The phosphate ions according to one exemplary embodiment of the present invention may be present in a phosphate compound.

According to the present invention, at least one compound selected from the group consisting of an orthophosphate compound, a phosphite compound, a phosphinic acid compound, and a condensed phosphate compound may be used as the phosphate compound.

According to the present invention, a molar concentration ratio between the zirconium ions and the phosphate ions may be in a range of 1:2 to 1:3. When a ratio of the phosphate ions with respect to the zirconium ions is less than 2, the zirconium ions may remain unreacted, whereas the phosphate ions may remain unreacted when the ratio of the phosphate ions with respect to the zirconium ions exceeds 3.

The kind of the acid compound according to the present invention is not particularly limited as long as it contains a hydrogen element. Preferably, hydrogen fluoride (HF) may be used herein.

According to the present invention, a concentration of the acid compound may be in a range of 0.1 to 1.0 M. When the concentration of the acid compound is less than 0.1 M, an amorphous zirconium phosphate may be formed, whereas no zirconium phosphate may be formed when the concentration of the acid compound exceeds 1.0 M.

The microemulsion according to one exemplary embodiment of the present invention may include water and oil.

The kind of the oil is not particularly limited. For example, a hydrocarbon having 6 to 16 carbon atoms may be used as the oil. That is, at least one selected from the group consisting of hexane, heptane, octane, nonane, decane, undecane, dodecane, tridecane, tetradecane, pentadecane, and hexadecane may be used as the oil.

According to the present invention, when the carbon atoms of the hydrocarbon are less than 6 or more than 16, an emulsion may not be formed.

According to the present invention, the contents of the water and oil are not particularly limited. For example, a weight ratio between the water and oil may be in a range of 1:10 to 1:20. When the weight ratio of the oil with respect to the water is less than 10, an increase in size of an emulsion may occur. On the other hand, when the weight ratio of the oil with respect to the water exceeds 20, the zirconium phosphate may be produced with low productivity due to a low concentration of the prepared emulsion.

The non-ionic surfactant according to one exemplary embodiment of the present invention may facilitate formation of a microemulsion by mixing oil with water in which components are dissolved, specifically, by uniformly dispersing water in oil.

In particular, the non-ionic surfactant may be desirably used since ions are not dissociated from a microemulsion, thereby causing no effect on the zirconium ion and phosphate ions.

According to the present invention, an oxyethylene-based surfactant may be used as a kind of the non-ionic surfactant. More particularly, at least one selected from the group consisting of polyoxyalkylene alkyl ether, polyoxyalkylene alkane ether, polyoxyethylene polyoxypropylene alkyl ether, polyoxyethylene propylene alkane ether, polyoxyethylene alkylphenyl ether, polyoxyethyl alkane phenyl ether, polyoxyethylenesorbitan fatty acid ester, and polyoxyethylene fatty acid ester may be used as the non-ionic surfactant. Preferably, polyoxyalkylene alkyl ether may be used herein.

According to the present invention, the non-ionic surfactant may be used at a content of 0.1 to 1 part by weight, based on 100 parts by weight of the microemulsion. When the content of the non-ionic surfactant is less than 0.1 parts by weight, a microemulsion may not be formed. On the other hand, when the content of the non-ionic surfactant exceeds 1 part by weight, the use of an excessive amount of the surfactant may cause an increasing concentration of an emulsion, which leads to degradation of reactivity.

FIG. 4 is a diagram specifically showing the microemulsion according to one exemplary embodiment of the present invention. In the microemulsion, the non-ionic surfactant lumps around a hydrophilic domain, and zirconium ions, phosphate ions, and a hydrogen fluoride are positioned in the hydrophilic domain.

According to the present invention, a fluoride compound in the microemulsion is volatilized by heating the microemulsion, and the zirconium ions and the phosphate ions react to form nanoplatelet-type particles (zirconium phosphate).

The zirconium phosphate may be easily dispersed not only in water but also in an organic solvent such as alcohol, acetone, methyl ethyl ketone, xylene, ketone, a thinner, and a UV-curable diluent.

According to the present invention, the heating may be performed at 40 to 60° C. for 15 to 30 hours. When the heating temperature is less than 40° C., a reaction rate may be slowed. On the other hand, when the heating temperature exceeds 60° C., a reaction rate may be accelerated, which prevents growth of the zirconium phosphate into a planar shape.

Also, the present invention is directed to providing a metal material including a substrate, and a resin coating layer formed on the substrate and including the above-described platelet-type zirconium phosphate.

According to the present invention, the substrate may include all kinds of substrates made of a metal, which may be subjected to surface treatment. The kind of the substrate is not particularly limited, but a metal sheet may be, for example, used as the substrate.

More particularly, according to the present invention, the metal sheet that may be used herein may include a cold-rolled steel sheet; a zinc-based electrogalvanized steel sheet such as a galvanized steel sheet, a zinc/nickel-plated steel sheet, a zinc/iron-plated steel sheet, a zinc/titanium-plated steel sheet, a zinc/magnesium-plated steel sheet, a zinc/manganese-plated steel sheet, or a zinc/aluminum-plated steel sheet; a molten galvanized steel sheet; an aluminum-plated steel sheet; a magnesium-plated steel sheet; a plated steel sheet obtained by adding heterogeneous metals or impurities, for example, cobalt, molybdenum, tungsten, nickel, titanium, aluminum, manganese, iron, magnesium, tin, and copper, to the plated layer; a plated steel sheet obtained by dispersing an inorganic element such as silica or alumina in the plated layer; an aluminum alloy plate having elements such as silicon, copper, magnesium, iron, manganese, titanium, and zinc added thereto; a magnesium alloy plate; a zinc-plated steel sheet coated with phosphate; or a hot-rolled steel sheet. As necessary, a multilayered plated sheet treated sequentially with at least two steel sheets during the plating process may be used.

The metal material according to the present invention may be widely used in the field of various industrial applications.

According to the present invention, a resin coating layer including the platelet-type zirconium phosphate is formed on the substrate.

The platelet-type zirconium phosphate may be uniformly dispersed at a nanoscale level in the resin coating layer to ensure surface gloss, improve barrier characteristics, and also improve corrosion resistance due to the presence of P—OH groups on a surface thereof.

According to the present invention, a method of forming a resin coating layer on a substrate is not particularly limited. Here, all the known surface treatment methods of forming a resin coating layer on a substrate using a resin composition may be used herein. For example, a resin coating layer may be formed on a substrate by roll-coating a substrate with a resin composition including the platelet-type zirconium phosphate and by UV-curing and/or thermally curing the resin composition. Also, a resin coating layer may be formed on a substrate by immersing the substrate in a surface treatment bath containing a resin composition and drying the substrate.

According to the present invention, a method of roll-coating a substrate with a resin composition including the platelet-type zirconium phosphate and of UV-curing or thermally curing the resin composition may be used.

In this case, a resin used to treat a surface of a metal may be used without limitation. Preferably, a radiation-curable resin, a solvent-type resin, or a water-soluble resin may be used herein. More particularly, a resin disclosed in Korean Patent Publication No. 2008-0088862 may be used as the radiation-curable resin, and a resin disclosed in Korean Patent Publication No. 2009-0133965 may be used as the water-soluble resin.

In the present invention, when the radiation-curable resin is used as the resin composition, the platelet-type zirconium phosphate according to the present invention may be used at a content of 1 to 10 parts by weight, based on the total weight of the resin. Gloss and corrosion resistance of the resin composition may be further improved when the radiation-curable resin further includes the platelet-type zirconium phosphate.

Also, when the water-soluble resin is used as the resin composition, the platelet-type zirconium phosphate according to the present invention may be used at a content of 0.5 to 10 parts by weight, based on the total weight of the resin. Scratch resistance and corrosion resistance of the resin composition may be further improved when the water-soluble resin further includes the platelet-type zirconium phosphate.

According to the present invention, the resin coating layer may have a thickness of 0.5 to 10 μm. When the thickness of the resin coating layer is less than 0.5 μm, corrosion resistance and processability may be degraded. On the other hand, when the thickness of the resin coating layer exceeds 10 μm, weldability and lubricating ability may be degraded.

Hereinafter, the present invention will be described in further detail with reference Examples falling within the scope of the present invention and Comparative Examples which do not fall within the scope of the present invention. However, it should be understood that description provided herein is not intended to limit the scope of the present invention.

EXAMPLE 1

1) Preparation of Platelet-Type Zirconium Phosphate

Additive compositions for treating a surface of a metal, which included 15 parts by weight of oil, 0.5 parts by weight of an oxyethylene-based non-ionic surfactant (trade name: Brij30), and a solution including 1M zirconium ions, 2.5 M phosphate ions, and an increasing concentration (0.1, 0.3, 0.5 and 0.7 M) of hydrogen fluoride, were heated at 50° C. for 24 hours to prepare platelet-type zirconium phosphates.

2) Preparation of Metal Material

PREPARATIVE EXAMPLE 1

Radiation-curable resin compositions (Korean Patent Application No. 2008-0088862), which included the zirconium phosphate having a hydrogen fluoride content of 0.5 M at contents of 0.5, 1, 2, and 4% by weight, respectively, among the platelet-type zirconium phosphates prepared in operation (1), were stirred for 20 minutes using a stirrer, bar- or roll-coated, and cured with UV rays (UV irradiation: 1,500 mJ/cm$^2$) to form a resin coating layer having a thickness of 5 μm.

PREPARATIVE EXAMPLE 2

Water-soluble resin compositions (Korean Patent Application No. 2002-0047986), which included the zirconium phosphate having a hydrogen fluoride content of 0.5 M at contents of 0.1, 0.5, 1 and 2% by weight, respectively, among the platelet-type zirconium phosphates prepared in operation (1), were stirred for 20 minutes using a stirrer, bar- or roll-coated, and thermally cured at a peak metal temperature (PMT) of 180° C. to form a resin coating layer having a thickness of 1 μm.

COMPARATIVE EXAMPLE 1

1) Preparation of Platelet-Type Zirconium Phosphate

A platelet-type zirconium phosphate was prepared, without using the oil and the surfactant, by heating water (aqueous solution) including 1 M zirconium ions, 2.5 M phosphate ions, and 1 M hydrogen fluoride at 50° C. for 24 hours, adding 10 to 20 parts by weight of an organic modifier, tetrabutyl ammonium bromide, to the resulting zirconium compound, and dispersing the organic modifier.

2) Preparation of Metal Material

An AF fingerprint-resistant resin composition (Korean Patent Application No. 2002-0047986) including the platelet-type zirconium phosphate prepared in operation (1) of Comparative Example 1 was bar- or roll-coated and thermally cured to form a resin coating layer having a thickness of 1 μm.

COMPARATIVE EXAMPLE 2

A resin coating layer may be formed in the same manner as in Preparative Example 1 of Example 1, except that a conventional silica additive was used.

COMPARATIVE EXAMPLE 3

A resin coating layer may be formed in the same manner as in Preparative Example 2 of Example 1, except that an organophosphate additive was used.

Figure 6:
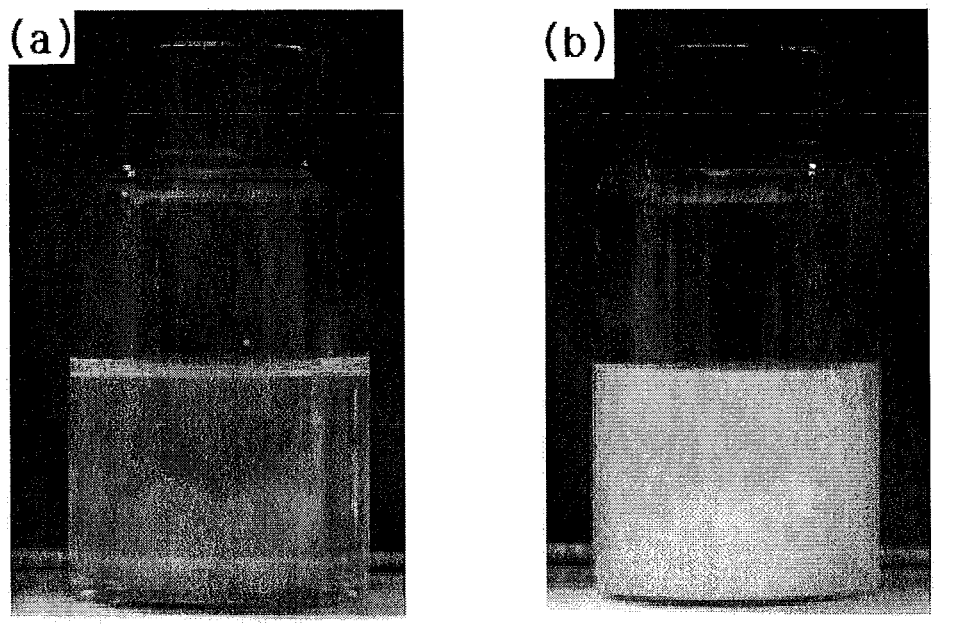
FIG. 6 is an image of the platelet-type zirconium phosphates prepared in Example 1 and Comparative Example 1 being dispersed in a liquid phase.

FIG. 5 is an SEM image showing the shapes of the platelet-type zirconium phosphates prepared in Example 1 and Comparative Example 1, and FIG. 6 is an image of the platelet-type zirconium phosphates prepared in Example 1 and Comparative Example 1 being dispersed in water.

In the present invention, FIGS. 5(a) to (d) show the particle shapes of the platelet-type zirconium phosphate when hydrogen fluoride used in Example 1 was present at an increasing content of 0.1, 0.3, 0.5 and 0.7 M, and FIG. 5(e) shows the particle shape of an additive used in Comparative Example 1.

As shown in FIG. 5, the platelet-type zirconium phosphate prepared in Example 1 had various shapes such as belt, lozenge, square, or hexagonal shapes, and the platelet-type zirconium phosphates prepared in the Comparative Examples had an amorphous shape.

Also, as shown in FIG. 6, the platelet-type zirconium phosphate prepared in Example 1 was uniformly dispersed in a liquid phase and thus became translucent (FIG. 6(a)), and the platelet-type zirconium phosphate prepared in Comparative Example 1 was not dispersed in a liquid phase and thus became opaque (FIG. 6(b)).

Figure 7:
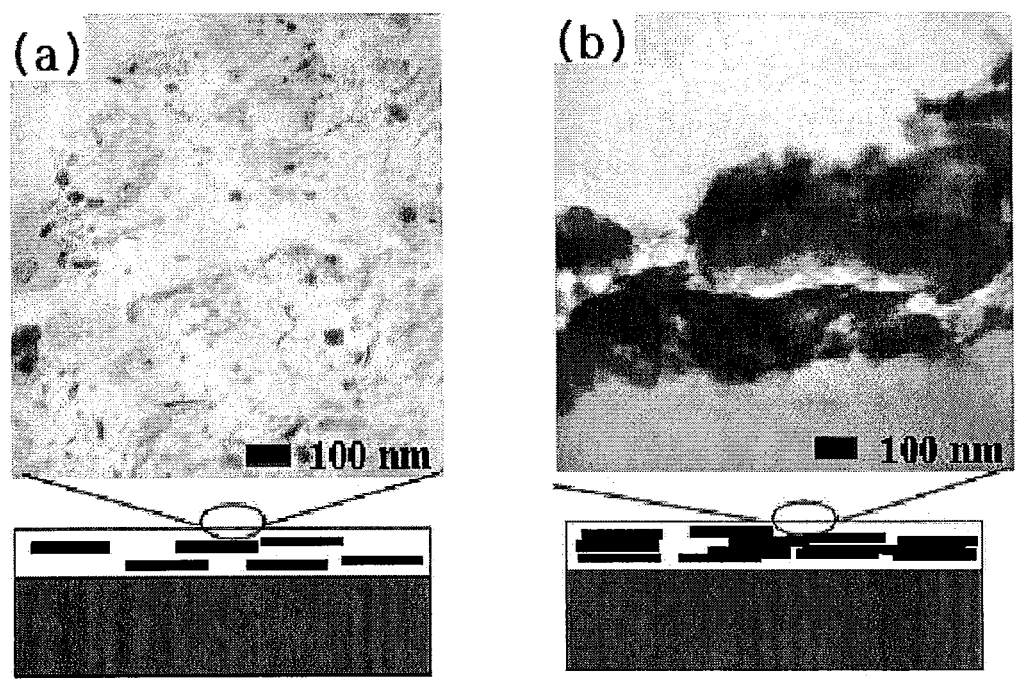
FIG. 7 is an SEM image showing the shapes of the platelet-type zirconium phosphates prepared in Example 1 and Comparative Example 1 being dispersed in a resin composition.

FIG. 7 is an SEM image showing the shapes of the platelet-type zirconium phosphates prepared in Example 1 and Comparative Example 1 being dispersed in a resin composition.

As shown in FIG. 7, the platelet-type zirconium phosphate prepared in Example 1 was uniformly dispersed in the resin coating layer (FIG. 7(a)), and the platelet-type zirconium phosphate prepared in Comparative Example 1 was formed into lump (FIG. 7(b)).

Figure 8:
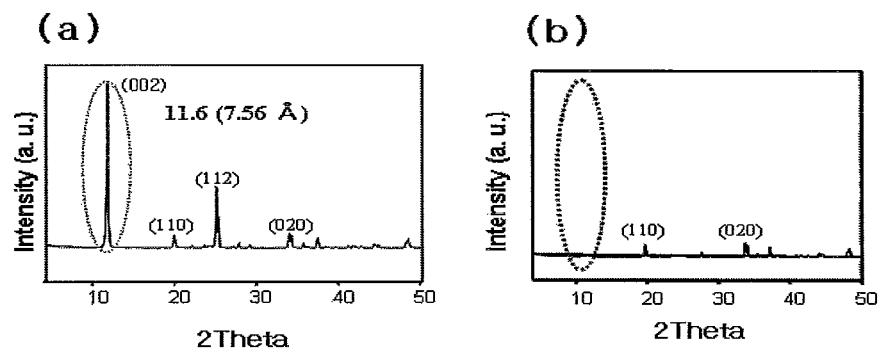
FIG. 8 is a graph illustrating the X-ray diffraction analysis results of the platelet-type zirconium phosphates prepared in Example 1 and Comparative Example 1.
Figure 9:
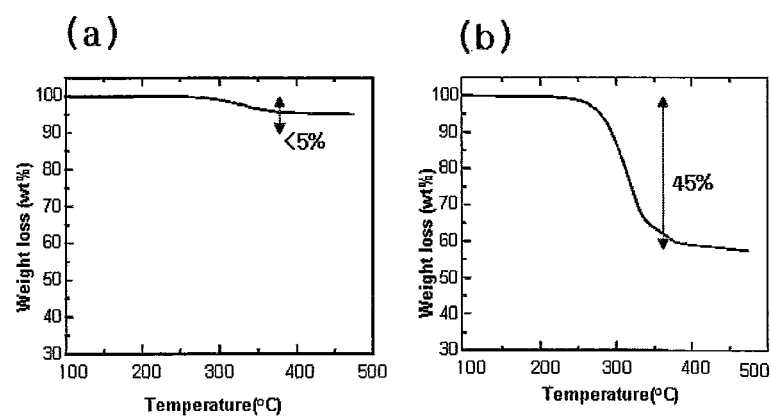
FIG. 9 is a graph illustrating the thermogravimetric analysis (TGA) results of the platelet-type zirconium phosphates prepared in Example 1 and Comparative Example 1.

FIGS. 8 and 9 are graphs illustrating the results of X-ray diffraction analysis (at 2q 1° to 50° and a scanning rate of 2°/min: FIG. 8) and TGA (at a temperature of 100° C. to 1000° C. and a heating rate of 10° C./min: FIG. 9) of the platelet-type zirconium phosphates prepared in Example 1 and Comparative Example 1.

As shown in FIG. 8, a domain spacing in a 001 direction was 0.75 nm in the case of the platelet-type zirconium phosphate prepared in Example 1 (see FIG. 8(a)), and a crystalline peak at 0.75 nm disappeared in the case of the Comparative Examples in which the platelet-type zirconium phosphate was dispersed in an organic modifier 1 (see FIG. 8(b)).

Also, as shown in FIG. 9, when the platelet-type zirconium phosphate prepared in Example 1 was heated at 500° C., the mass loss was less than 5% (see FIG. 9(a)), while the mass loss was 10 to 50% in the case of Comparative Example 1 in which the platelet-type zirconium phosphate was treated with an organic modifier (see FIG. 9(b)).

The gloss and corrosion resistance of the metal materials prepared in Preparative Example 1 in Example 1 and Comparative Example 2 are listed in the following Table 1.

As such, the gloss was measured using GlassMeter, and the corrosion resistance was measured through a salt spray test using 5% NaCl.

TABLE 1

| Content of platelet-type zirconium phosphate (part(s) by weight) | Gloss (Glass at 60° C.) | | Corrosion resistance (SST) | |
|---|---|---|---|---|
| | Comparative Example 2 | Example 1 | Comparative Example 2 | Example 1 |
| 0.5 | 140 | 150 | 48 Hr | 72 Hr |
| 1 | 120 | 140 | 72 Hr | 120 Hr |
| 2 | 100 | 135 | 72 Hr | 240 Hr |
| 4 | 70 | 130 | 72 Hr | 240 Hr |

As listed in Table 1, it was revealed that the metal material using the platelet-type zirconium phosphate additive according to the present invention showed excellent gloss and had superior corrosion resistance, compared with the metal material using the conventional additive (i.e., silica) used in Comparative Example 2.

Figure 10:
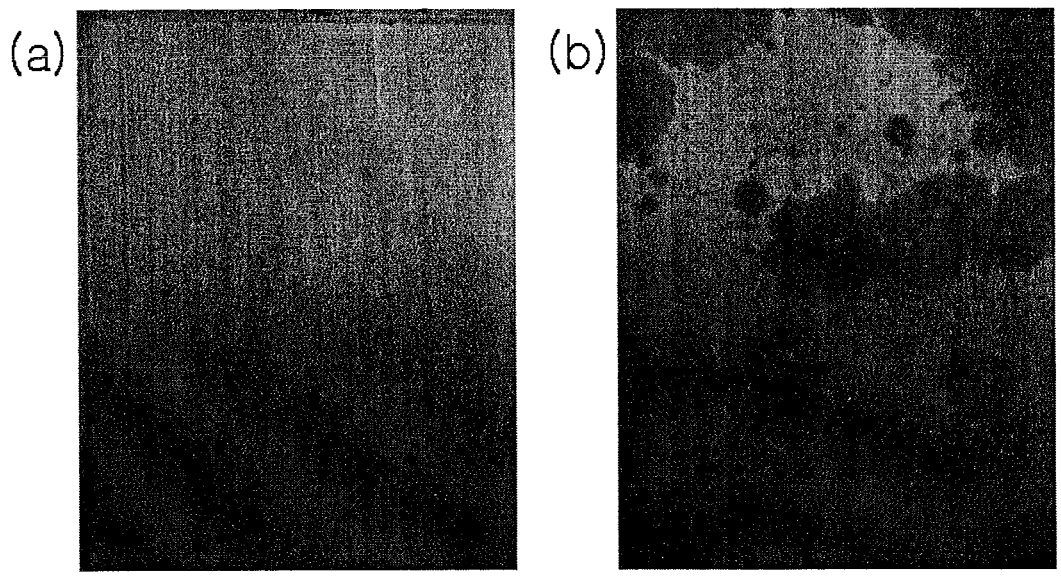
FIGS. 10 and 11 are images showing the corrosion resistances of metal materials prepared in Preparative Example 1 in Example 1 and Comparative Example 2.

The results were confirmed as shown in FIG. 10. FIG. 10(a) shows the SST 240 Hr corrosion resistance of the metal material (in which the additive was used at a content of 1 part by weight) prepared in Preparative Example 1 in Example 1, and FIG. 10(b) shows the SST 48 Hr corrosion resistance of the metal material prepared in Comparative Example 2. As shown in FIG. 10, the metal materials prepared in Example 1 showed excellent corrosion resistance.

Also, the scratch resistance and corrosion resistance of the metal materials prepared in Preparative Example 2 in Example 1 and Comparative Example 3 are listed in the following Table 2.

As such, the scratch resistance was measured under a load of 1 kg using Mitsubishi Uni.

TABLE 2

| Content of platelet-type zirconium phosphate (parts by weight) | Scratch resistance (Pencil Hardness) | | Corrosion resistance (SST) | |
|---|---|---|---|---|
| | Comparative Example 3 | Example 1 | Comparative Example 2 | Example 1 |
| 0.1 | B | HB | 24 Hr | 48 Hr |
| 0.5 | B | F | 48 Hr | 72 Hr |
| 1 | B | H | 48 Hr | 96 Hr |
| 2 | B | H | 48 Hr | 96 Hr |

As listed in Table 2, it was revealed that the metal material using the platelet-type zirconium phosphate additive according to the present invention showed very excellent scratch resistance (pencil hardness) and corrosion resistance, compared with the metal material using the conventional additive (i.e., an organophosphate-based additive) used in Comparative Example 2.

Figure 11:
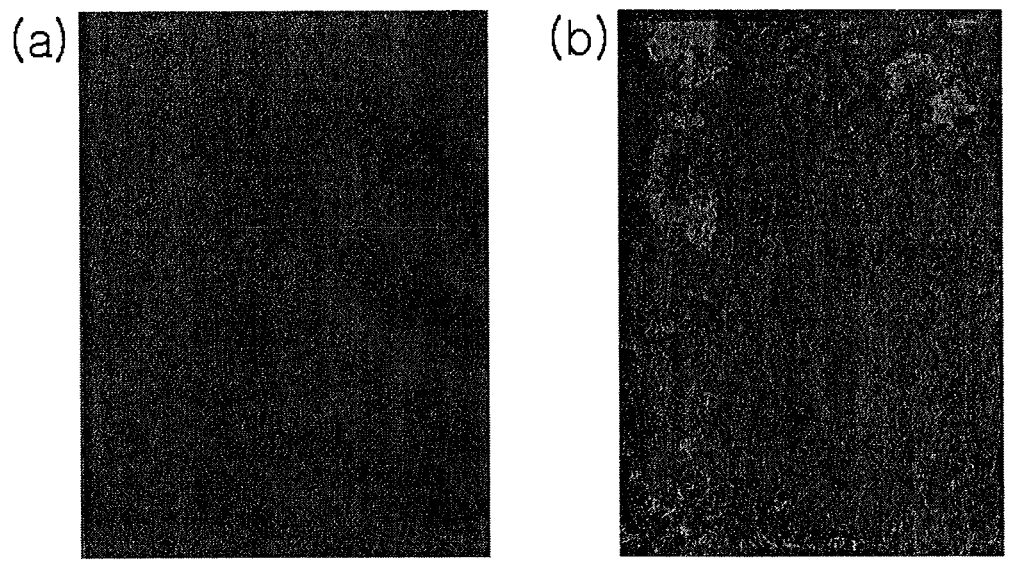

The results were confirmed as shown in FIG. 11. (FIG. 11(a) shows the SST 96 Hr corrosion resistance of the metal material (in which the additive was used at a content of 0.5 parts by weight) prepared in Preparative Example 2 in Example 1, and FIG. 11(b) shows the SST 24 Hr corrosion resistance of the metal material prepared in Comparative Example 3. As shown in FIG. 11, the metal materials prepared in Example 1 showed excellent corrosion resistance.

The platelet-type zirconium phosphate according to the present invention can be effectively used as an additive for treating a surface of a metal since the platelet-type zirconium phosphate can be uniformly dispersed at a nanoscale level in a resin coating layer to exhibit excellent surface gloss and barrier capability, can exhibit excellent corrosion resistance due to the presence of the P—OH group on a surface thereof, and can be dispersed not only in an aqueous solution but also in an organic solvent.

INDUSTRIAL APPLICABILITY

The platelet-type zirconium phosphate according to the present invention can be effectively used as an additive for treating a surface of a metal.

While the invention has been shown and described with reference to certain exemplary embodiments thereof, it will be understood by those skilled in the art that various changes in form and details may be made therein without departing from the scope of the invention as defined by the appended claims.

What is claimed is:

1. A method for preparing a platelet-type zirconium phosphate, comprising:
    preparing a microemulsion by, (i) mixing oil with water including zirconium ions, phosphate ions and hydrogen fluoride, to form a mixture, and (ii) adding a non-ionic surfactant to said mixture; and
    heating said microemulsion at 40° C. to 60° C.

2. The method of claim 1, wherein a molar concentration ratio between the zirconium ions and the phosphate ions is in a range of 1:2 to 1:3.

3. The method of claim 1, wherein the hydrogen fluoride is present at a concentration of 0.1 to 1.0 M in the microemulsion.

4. The method of claim 1, wherein a weight ratio between water and oil in the microemulsion is in a range of 1:10 to 1:20.

5. The method of claim 4, wherein the oil is a hydrocarbon having 6 to 16 carbon atoms.

6. The method of claim 1, wherein the non-ionic surfactant is an oxyethylene-based surfactant.

7. The method of claim 1, wherein the non-ionic surfactant is present at a content of 0.1 to 1 part by weight, based on 100 parts by weight of the microemulsion.

* * * * *